United States Patent
Spicer et al.

(10) Patent No.: US 8,386,087 B2
(45) Date of Patent: Feb. 26, 2013

(54) LOAD SHED SYSTEM FOR DEMAND RESPONSE WITHOUT AMI/AMR SYSTEM

(75) Inventors: Lucas Bryant Spicer, Louisville, KY (US); John K. Besore, Prospect, KY (US); Timothy Dale Worthington, Crestwood, KY (US); Michael Francis Finch, Louisville, KY (US)

(73) Assignee: General Electric Company, Schenectady, NY (US)

( * ) Notice: Subject to any disclaimer, the term of this patent is extended or adjusted under 35 U.S.C. 154(b) by 83 days.

(21) Appl. No.: 12/848,615

(22) Filed: Aug. 2, 2010

(65) Prior Publication Data

US 2012/0029713 A1   Feb. 2, 2012

(51) Int. Cl.
G05B 11/01   (2006.01)
(52) U.S. Cl. .................. 700/291; 700/295; 700/22
(58) Field of Classification Search .............. 700/291, 700/295, 22; 702/62, 183
See application file for complete search history.

(56) References Cited

U.S. PATENT DOCUMENTS

| | | | | |
|---|---|---|---|---|
| 4,245,319 A * | 1/1981 | Hedges | ............. | 700/296 |
| 4,247,786 A * | 1/1981 | Hedges | ............. | 307/35 |
| 4,819,180 A * | 4/1989 | Hedman et al. | ............. | 700/291 |
| 5,426,620 A * | 6/1995 | Budney | ............. | 368/10 |
| 5,481,140 A * | 1/1996 | Maruyama et al. | ............. | 307/11 |
| 5,572,438 A * | 11/1996 | Ehlers et al. | ............. | 700/295 |
| 5,640,153 A * | 6/1997 | Hildebrand et al. | ............. | 340/7.1 |
| 5,668,446 A * | 9/1997 | Baker | ............. | 315/294 |
| 5,696,695 A * | 12/1997 | Ehlers et al. | ............. | 700/286 |
| 5,717,609 A * | 2/1998 | Packa et al. | ............. | 702/130 |
| 5,962,989 A * | 10/1999 | Baker | ............. | 315/294 |
| 6,167,389 A * | 12/2000 | Davis et al. | ............. | 705/412 |
| 7,130,719 B2 * | 10/2006 | Ehlers et al. | ............. | 700/276 |
| 7,343,226 B2 * | 3/2008 | Ehlers et al. | ............. | 700/276 |
| 7,409,303 B2 * | 8/2008 | Yeo et al. | ............. | 702/60 |
| 7,460,931 B2 * | 12/2008 | Jacobson | ............. | 700/295 |
| 7,698,233 B1 * | 4/2010 | Edwards et al. | ............. | 705/412 |
| 7,702,424 B2 * | 4/2010 | Cannon et al. | ............. | 700/295 |
| 7,869,904 B2 * | 1/2011 | Cannon et al. | ............. | 700/295 |
| 7,904,382 B2 * | 3/2011 | Arfin | ............. | 705/38 |
| 7,925,552 B2 * | 4/2011 | Tarbell et al. | ............. | 705/30 |
| 8,014,905 B2 * | 9/2011 | Ehlers | ............. | 700/295 |
| 8,019,697 B2 * | 9/2011 | Ozog | ............. | 705/412 |
| 8,024,073 B2 * | 9/2011 | Imes et al. | ............. | 700/276 |
| 8,082,065 B2 * | 12/2011 | Imes et al. | ............. | 700/276 |
| 8,099,195 B2 * | 1/2012 | Imes et al. | ............. | 700/278 |
| 8,170,695 B2 * | 5/2012 | Spicer et al. | ............. | 700/22 |
| 2003/0101009 A1 * | 5/2003 | Seem | ............. | 702/61 |
| 2004/0225649 A1 * | 11/2004 | Yeo et al. | ............. | 707/3 |
| 2006/0259199 A1 * | 11/2006 | Gjerde et al. | ............. | 700/284 |

(Continued)

OTHER PUBLICATIONS

California Energy Commission, "Final Report Compilation for Aggrigated Load Shedding", Oct. 2003, Technical Report, P-500-03-096-A12.*

(Continued)

Primary Examiner — Mohammad Ali
Assistant Examiner — Kelvin Booker
(74) Attorney, Agent, or Firm — Global Patent Operation

(57) ABSTRACT

An apparatus and methods are disclosed for controlling load shedding and payback spikes of a population by segregating the population into subsets based on predicted energy consumption usage and peak load profiles. Subset populations respond independently from another based on a communication message sent to the population. Each subset population of homes with one or more energy consuming devices responds based on a generated value generated from a randomizing distribution routine.

20 Claims, 9 Drawing Sheets

U.S. PATENT DOCUMENTS

| | | | |
|---|---|---|---|
| 2007/0043478 A1* | 2/2007 | Ehlers et al. | 700/276 |
| 2007/0213880 A1* | 9/2007 | Ehlers | 700/295 |
| 2007/0220907 A1* | 9/2007 | Ehlers | 62/126 |
| 2008/0272934 A1* | 11/2008 | Wang et al. | 340/870.11 |
| 2009/0063228 A1* | 3/2009 | Forbes, Jr. | 705/7 |
| 2009/0102680 A1* | 4/2009 | Roos | 340/870.02 |
| 2009/0134717 A1* | 5/2009 | Marks | 307/149 |
| 2009/0234685 A1* | 9/2009 | Tarbell et al. | 703/2 |
| 2009/0234750 A1* | 9/2009 | Arfin | 705/26 |
| 2009/0234757 A1* | 9/2009 | Tarbell et al. | 705/30 |
| 2010/0010939 A1* | 1/2010 | Arfin et al. | 705/412 |
| 2010/0057480 A1* | 3/2010 | Arfin et al. | 705/1 |
| 2010/0057582 A1* | 3/2010 | Arfin et al. | 705/26 |
| 2010/0145534 A1* | 6/2010 | Forbes et al. | 700/291 |
| 2010/0179862 A1* | 7/2010 | Chassin et al. | 705/10 |
| 2010/0217550 A1* | 8/2010 | Crabtree et al. | 702/62 |
| 2010/0250590 A1* | 9/2010 | Galvin | 707/770 |
| 2010/0262313 A1* | 10/2010 | Chambers et al. | 700/295 |
| 2011/0035073 A1* | 2/2011 | Ozog | 700/291 |
| 2011/0137752 A1* | 6/2011 | Arfin | 705/26.61 |
| 2011/0173110 A1* | 7/2011 | Tarbell et al. | 705/34 |
| 2011/0202194 A1* | 8/2011 | Kobraei et al. | 700/295 |
| 2011/0202195 A1* | 8/2011 | Finch et al. | 700/295 |
| 2011/0202293 A1* | 8/2011 | Kobraei et al. | 702/62 |
| 2011/0282504 A1* | 11/2011 | Besore et al. | 700/291 |
| 2012/0016524 A1* | 1/2012 | Spicer et al. | 700/276 |

OTHER PUBLICATIONS

Chen, J.; Lee, F.R.; Breipohl, A.M.; and Adapa, R., "Scheduling Direct Load Control to Minimize System Operational Cost", Nov. 1995, IEEE Transactions on Power Systems, vol. 10, No. 4.*

Energy Center of Wisconsin, "Report: Reducing Peak Demand with Energy Management Control Systems—A Field Study", Feb. 1998, obtained online Jan. 19, 2012 at www.ecw.org.*

Eto, J.; "The Past, Present, and Future of U.S. Utility Demand-Side Management Programs", Dec. 1996, Environmental Energy Technologies Division, Ernest Orlando Lawrence Berkley National Laboratory, LBNL-39931, UC-1322.*

Gomes, A.; Martins, A.G. and Figueiredo, R., "Simulation-Based Assessment of Electric Load Management Programs", Jun. 1998, International Journal of Energy Research, vol. 23, pp. 169-181.*

Lee, T.; Cho, M.; Hsiao, Y.; Chao, P. and Fang, F., "Optimization and Implementation of a Load Control Scheduler Using Relaxed Dynamic Programming for Large Air Conditioner Loads", May 2008, IEEE Transactions on Power Systems, vol. 23, No. 2.*

Bouchelle, M.P.; Parker, D.S. and Anello, M.T., "Factors Influencing Water Heating Energy Use and Peak Demand in a Large Scale Residential Monitoring Study", May 2000, The Symposium on Improving Building Systems in Hot and Humid Climates.*

Molina, A.; Gabaldon, A.; Fuentes, J.A. and Canovas, F.J., "Approach to Multivariable Predictive Control Applications in REsidential HVAC Direct Load Control", Jul. 2000, Power Engineering Society Summer Meeting, vol. 3, pp. 1811-1816, ISBN: 0-7803-6420-1.*

Ramanathan, B.N., "Power System Security Enhancement Through Direct Non-Disruptive Lead Control", 2005, Dissertation for Doctor of Philosophy in Electrical Engineering, Iowa State University.*

Al-Shakarchi, M. and Abu-Zeid, N., "A Study of Load Management by Direct Control for Jordan's Electrical Power System", 2002, Journal of Science and Technology, vol. 7, No. 2.*

Lighting Research Center, "Lighting Research Program, Project 3.2 Energy Efficient Load-Shedding Lighting Technology, Final Report", Oct. 2005, California Energy Commission, Public Interest Energy Research Program, Consultant Report, CEC-500-2005-141-A6.*

Intuitive Research & Technology Corporation, "Department of Defense Energy Manager's Handbook" Aug. 2005.*

Lighting Research Center, "Lighting Research Program, Project 3.2 Energy Efficient Load-Shedding Lighting Technology", Oct. 2005, California Energy Commission, Public Interest Energy Research Program, PIER Final Project Report, CEC-500-2005-141-A6.*

New York State Energy Research and Development Authority, "Demonstration of Commercial Energy Storage Device in Edge-of-Grid Application With and Without a Fuel Cell Plus Broader Market Feasibility Study for Commercial Applications", Jul. 2008, Final Report Aug. 2008.*

Architectural Energy Corporation, "Energy Efficient Load Shedding Technology Economic Considerations", Aug. 2003, PIER Lighting Research Program, California Energy Commission Contract No. 500-01-041.*

Architectural Energy Corporation, "Roundtable Load-Shedding Proceedings Report", Apr. 2003, PIER Lighting Research Program, California Energy Commission Contract No. 500-01-041.*

University of Florida Center for Training, Research & Education for Environmental Occupations, "Documenting and Improving Energy Use in Water Quality Systems", 2003, EPA Assistance Agreement CP-830676-01-0.*

* cited by examiner

LOAD SHED SYSTEM FOR DEMAND RESPONSE WITHOUT AMI/AMR SYSTEM

BACKGROUND

This disclosure relates to energy management, and more particularly to electrical device control methods and electrical energy consumption systems. The disclosure finds particular application to energy management of appliances, for example, dishwashers, clothes washers, dryers, HVAC systems, etc.

In order to reduce high peak power demand, many utilities have instituted time of use (TOU) metering and rates, which include higher rates for energy usage during on-peak times and lower rates for energy usage during off-peak times. As a result, consumers are provided with an incentive to use electricity at off-peak times rather than on-peak times and to reduce overall energy consumption of appliances at all times.

Utility power systems become "smart" and demand response enabled by employing a head end management system, such as a company or program responsible for monitoring and running a demand response program. This usually requires equipment and time investments by utilities to install automatic meter reading (AMR) systems, advanced metering infrastructure, or other types of "smart" utility meters in each home. AMR systems, for example, provide for automatically collecting consumption, diagnostic, and status data from water meter or energy metering devices (water, gas, electric) and transferring that data to a central database for billing, troubleshooting, and analyzing. AMI represents the networking technology of fixed network meter systems that go beyond AMR into remote utility management. The meters in an AMI system are often referred to as smart meters, since they can use collected data based on programmed logic.

Smart grid applications improve the ability of electricity producers and consumers to communicate with one another and make decisions about how and when to produce and consume power. Demand response (DR) technology, for example, allows customers to shift from an event based demand response where the utility requests the shedding of load, towards a more 24/7 based demand response where the customer sees incentives for controlling load all the time. One advantage of a smart grid application is time-based pricing. Customers who traditionally pay a fixed rate for kWh and kW/month can set their threshold and adjust their usage to take advantage of fluctuating prices. Another advantage, is being able to closely monitor, shift, and balance load in a way that allows the customer to save peak load and not only save on kWh and kW/month but be able to trade what they have saved in an energy market. However, this involves sophisticated energy management systems, incentives, and a viable trading market.

When TOU or DR events initiate a number of users turning appliances on at the same time can create an initial influx of power that is up to several times the normal load on a power grid. This initial influx could compromise a power grid as well as cause it to be fully loaded, and thus, cause a reduction or shut off in power temporarily (e.g., brown outs or black outs). In addition, expenditures to run outside "peek" plants are costly and may not be as environmentally friendly.

Therefore, a need exists to provide a method and system to run demand response systems without the need to invest in AMR or AMI technology. Utilities may instruct power consuming devices to enable them to limit peak load and/or smooth payback spikes for saving money and avoiding power outages.

SUMMARY

More specifically, the present disclosure provides an appliance with a memory comprising a controller in communication with an associated utility. An original serial number assigned to either the appliance and/or a controller (e.g., a processor) of the appliance is used to generate a generated value for communication with the utility. This generated value is used to alter parameters of the device, such as run time and/or temperature set points as well as for assigning different devices to different populations as a method to control payback load spikes.

In one embodiment, a method for an energy control system is provided to control load shedding and payback spikes of a total population having a plurality of subset populations of homes that include one or more energy consuming devices. An energy usage and peak load profile is determined for the total population of homes based on physical parameters of each home. The total population of homes is segregated into the plurality of subset populations by a randomizing distribution routine. Each subset population is controlled independently for a demand response event to operate each subset population independently in a normal operating mode and an energy savings mode based on a state of an energy supplying utility that is indicative of at least one of a peak demand period and an off peak-demand period, wherein the demand response event is executed for the total population by each subset population responding dependently via an incoming communication message.

In another embodiment, an energy management system is disclosed for one or more appliances. The system comprises a controller for managing power consumption within a household. The controller is configured to receive and process a signal indicative of one or more energy parameters of an associated energy supplying utility, including at least a peak demand period or an off-peak demand period. The controller is configured to send a command instruction to appliances in one of a plurality of operating modes, including at least a normal operating mode and an energy savings mode in response to the received signal. The one or more appliances operate in the normal operating mode during the off-peak demand period and operate in the energy savings mode during the peak demand period, wherein the controller is configured to control the return of the one or more appliances to the normal operating mode after the peak demand period is over to prevent an energy surge for the associated energy supplying utility, wherein the controller is configured to randomize a distribution of homes in a total population of homes among subset populations of the total population having different demand response event length times, temperatures setpoint changes, and start times associated therewith for controlling the subset populations for a demand response event.

The advantages of this system is that progammable communicating thermostats or other communicating devices for an appliance can receive one-way communication signals (e.g., radio data system communication, pager, etc.) to run a DR program with load shedding and payback spike reduction. This disclosure is not limited to any one type of communication infrastructure. For example, a two-way communication infrastructure may be employed also. Further, the utility does not require "smart meters" or a head end manager service, and the residential users do not require a home area network, broadband Internet or a computer for communication.

Another advantage is a low cost, low maintenance self managed DR program that is based on the enabled devices in the home not the infrastructure around them.

DETAILED DESCRIPTION

Figure 1:
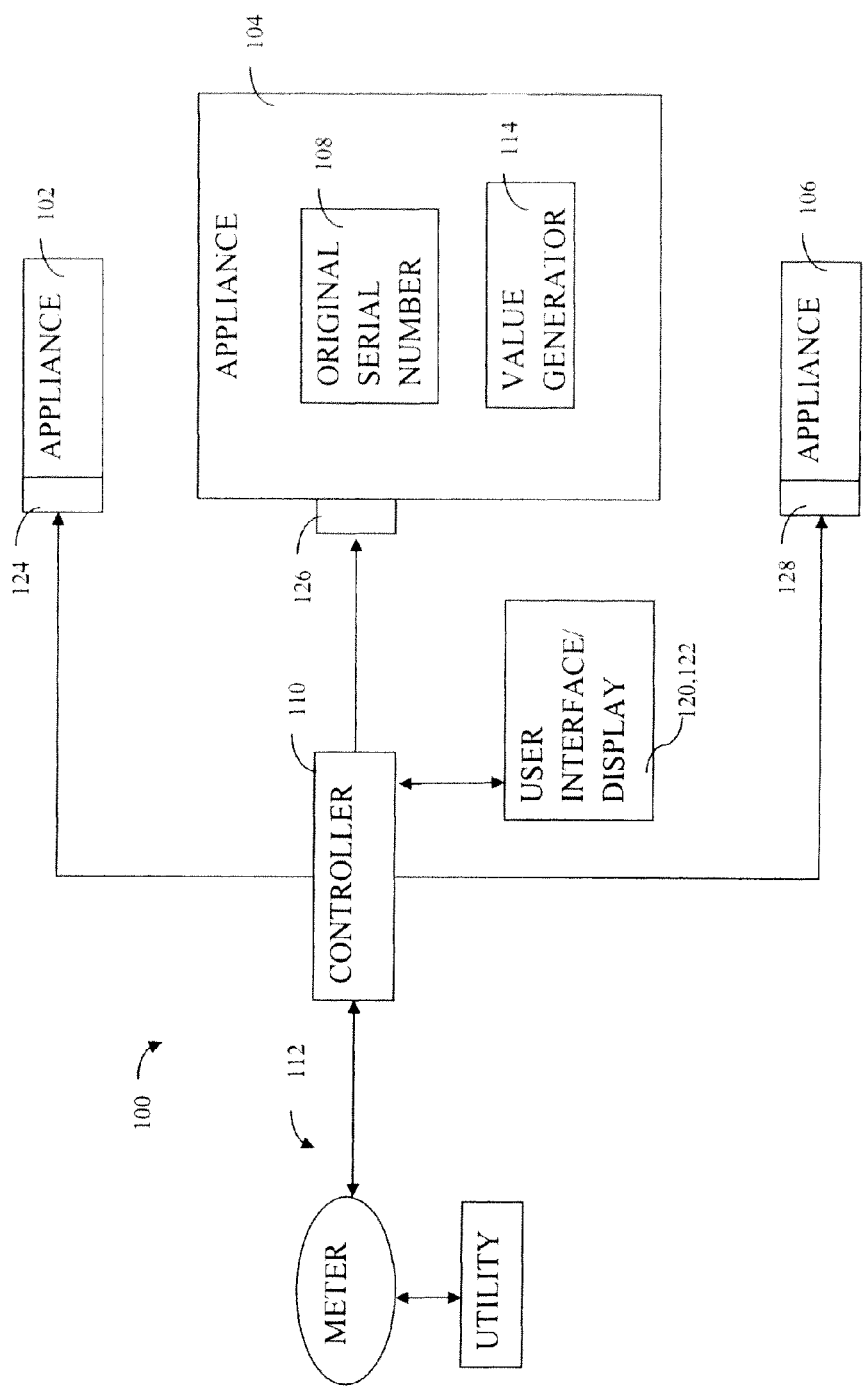
FIG. 1 is a schematic illustration of an energy management system with one or more appliances in accordance with one aspect of the present disclosure.

Utilities provide energy through systems that shed load at peak times during the day. For example, about 50% of home energy cost is due to heating and cooling. In the hot summer months air conditioning can account for 60-70% of home energy costs. Peak loads during hot summer days can approach the supply level of the provider, which produces brownouts and higher average energy costs. To constantly meet demand, utilities can receive power from outside on the market or engage additional plants to generate power (e.g., gas fired plants), which require additional investment to have plants on stand-by. Thus, ongoing issues of concern involve how to dispatch load on the system and how to meet energy requirements without additional plants or having a brownout.

Demand response (DR) systems control energy load at the home user level. For example, air conditioning (AC) load can be controlled with a Programmable Communicating Thermostat (PCT). DR systems increase average user comfort by reducing loss of service failures and total energy costs (versus paying for auxiliary power generation). One way of shedding load and/or smooth payback load spikes is to provide head end equipment at the consumer receiving end of the grid system through a high initial investment cost, such as installing "smart meters," two-way communication systems, and/or infrastructure. This may also involve maintenance costs involving service of a head end manager, servicing communication systems and devices, such AMR and/or AMI systems. The cost and complexity of such systems reduces acceptance and adoption by both utilities and consumers.

One option involving a low cost investment is to utilize one-way communication system that can rely on FM radio data system (FM-RDS) communication, or other one-way system, such as a pager (about 900 MHz), Zigbee, wifi, etc. It will be obvious to most that utilizing FM radio stations to provide the communications path for triggering Demand Response events will be a low cost solution. The coverage of a high powered radio station is extremely expanse which provides the ability to send signals to large numbers of receivers scattered over a very large geographic area.

A low investment cost can be realized through various systems, such as a PCT that costs little more than a standard digital thermostat with no additional installation costs. The equipment can involve a signal/communication box coupled to an appliance for receiving a message that informs a processor of an appliance to turn the appliance on/off (e.g., an air conditioner compressor, electric water heater, etc. In most Demand response systems in place today controlled devices from among a total population are signaled to power on or off at different times in a moving fashion around the city grid so that no one device is always being turned on and off at the same time every day. For example, one subdivision of the population (e.g., a subset population) at a time can be addressed to be powered on and off before another subdivision. In the present disclosure, serial numbers of the appliances/appliance microcontrollers in the subdivision are used to distinguish among candidates for powering on or off at specific times. This prevents all air conditioners within a certain radius or population, for example, from coming off or on at one time, which could have a devastating effect.

In one exemplary embodiment, a generated serial number (GSN) is created from the original serial number of the appliance and/or the appliance's microcontroller in order to produce a non-random number to be distributed or spread out evenly across a distribution curve ranging from the lowest serial number possible to the highest serial number possible (e.g., 000000 thru 999999). This distribution represents the generated serial numbers spread throughout a subset population of serial numbers. This will be discussed in greater detail below.

A generated value (GV) is produced as a percentage from the GSN. The maximum possible generated serial number is thus divided by any given GSN of a particular appliance to determine where in the subset population the GSN lays. For example, if serial numbers comprise six digits a GSN produced from the OSN could be 555555. When the GSN is divided by the maximum to determine its percentage within the population the GV is 555555/999999, which is about 55% after multiplying by 100. The GV is therefore a level or percentage in which the GSN represents within the subset population and is used for selecting where to shut down or to provide power within the subset population of homes. For example, the top fifty percent of homes may have their setpoint temperature raised before the lower 50% of appliances based on the distribution of GSN numbers, which is a random distribution to treat customers equally by revolving the GSN number throughout the distribution by either decrementing the GV or incrementing it with each DR event.

Raising the setpoint temperature of a home for a given amount of time removes that home's air conditioning (AC) load until the home warms to a new raised setpoint. When the given amount of time is over, the homes attempt to return to their original setpoints simultaneously, which causes a payback load spike. However, if a subset population of the total population delays having their setpoint adjusted, their load reduction can be used to offset and smooth the payback caused by the remaining population. This setback is governed by the GVs created from GSNs that are incremented or decremented for subsequent DR events. As stated above, the GSNs are in turn generated from original serial numbers of an appliance and/or the appliance's microcontroller provided by a manufacturer.

All appliances are assigned a sequential serial number at production either for the appliance as a whole or the appliance's microprocessor, or both. A random distribution of the generated values is in turn produced. The distribution is then used to equitably process different populations of homes for DR event schemes. For purposes of this disclosure, the sequentially assigned serial numbers will be called an Original Serial Number (OSN) and the generated numbers will be called a Generated Serial Number (GSN), while percentage values of the GSNs within a subset or population of GSNs will be coined generated values (GVs).

An advantage to creating a distribution of values for GVs is so that groups of appliances or subset populations of appliances in homes do not follow the same powering and off scheme for a DR event. For example, a distribution of generated values prevents all of the low end serial numbers to end up following the same or similar DR event scheme. As often may be the case for example, where devices of closely numbered OSNs are purchased from the manufacturer in a particular regional area or at a particular time, the OSNs of those appliances are thus prevented from being globally random or randomly distributed across the total population causing controlling schemes to not be as effective. Thus, GSNs generated from the OSNs can provide non-random numbers to be distributed or spread across an entire range of values for a given en total population. Further, in order to make the treatment of all groups or subset populations within a given total population of appliances equal, the GVs are incremented or decrement through the range of all possible values, and consequently, all possible subset populations. The GVs are then used to control DR events within subset populations.

FIG. 1 schematically illustrates an exemplary energy management system 100 for one or more appliances 102, 104, 106 according to one aspect of the present disclosure. Each of the appliances 102, 104, 106 can comprise one or more power consuming features/functions. For example, appliance 104 can be a refrigerator and/or an HVAC system including a refrigeration system. Each appliance and/or controller includes an original serial number 108. A non-random parametric value generator 114 is configured to enable the appliance to change demand response events, different demand response profiles for an assigned population subset, user inputs and price signals received based on a generated serial number formed from the original serial number 108. The energy management system 100 generally comprises a controller 110 for managing power consumption within a household. The controller 110 is operatively connected to each of the power consuming features/functions. The controller 110 can include a micro computer on a printed circuit board, which is programmed to selectively send signals to an appliance control board 124, 126, 128 of appliance 102, 104, and/or 106 respectively in response to the input signal it receives. The appliance controller will then, in turn, manipulate energization of the power consuming features/functions thereof.

The controller 110 is configured to receive a signal 112 by a receiver and process the signal indicative of one or more energy parameters and/or a utility state of an associated energy supplying utility, for example, including availability and/or current cost of supplied energy. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 110 is configured to at least one of communicate to, control and operate the appliances 102, 104, 106 in one of a plurality of operating modes, including at least a normal operating mode and an energy savings mode in response to the received signal. Specifically, each appliance can be operated in the normal operating mode during the off-peak demand state or period and can be operated in the energy savings mode during the peak demand state or period. As will be discussed in greater detail below, the controller 110 is configured to communicate with each appliance to precipitate the return of the appliances to the normal operating mode after the peak demand period is over to prevent an energy surge for the associated energy supplying utility. Alternatively, the control board of each appliance could be configured to receive communication directly from the utility, process this input, and in turn, invoke the energy savings modes, without the use of the centralized controller 110.

If the controller 110 receives and processes an energy signal indicative of a peak demand state or period at any time during operation of the appliances 102, 104, 106, the controller makes a determination of whether one or more of the power consuming features/functions of each appliance should be operated in the energy savings mode and if so, it signals the appropriate features/functions of each appliance to begin operating in the energy savings mode in order to reduce the instantaneous amount of energy being consumed by the appliances. The controller 110 is configured to communicate with the appliance control board 124 thru 128 to provide command instructions for the appliance control board to govern specific features/functions to operate at a lower consumption level and determine what that lower consumption level should be. This enables each appliance to be controlled by the appliance's controller where user inputs are being considered directly, rather than invoking an uncontrolled immediate termination of the operation of specific features/functions of an appliance from an external source, such as a utility. It should be appreciated that the controller 110 can be configured with default settings that govern normal mode and energy savings mode operation. Such settings in each mode can be fixed while others adjustable to user preference and to provide response to load shedding signals.

The controller 110 includes a user interface 120 having a display 122 and control buttons for making various operational selections. The display can be configured to provide active, real-time feedback to the user on the cost of operating each appliance 102, 104, 106. The costs are generally based on the current operating and usage patterns and energy consumption costs, such as the cost per kilowatt hour charged by the corresponding utility. The controller 110 is configured to gather information and data related to current usage patterns and as well as current power costs. This information can be used to determine current energy usage and cost associated with using each appliance in one of the energy savings mode and normal mode. This real-time information (i.e., current usage patterns, current power cost and current energy usage/cost) can be presented to the user via the display.

The duration of time that each appliance 102, 104, 106 operates in the energy savings mode may be determined by information in the energy signal. For example, the energy signal may inform the controller 110 to operate in the energy savings mode for a few minutes or for one hour, at which time each appliance 102, 104, 106 returns to normal operation. Alternatively, the energy signal may be continuously transmitted by the utility provider, or other signal generating system, as long as it is determined that instantaneous load reduction is necessary. Once transmission of the signal has ceased, each appliance returns to normal operating mode. In yet another embodiment, an energy signal may be transmitted to the controller 110 to signal each appliance 102, 104, 106 to operate in the energy savings mode. A normal operation signal may then be later transmitted to the controller to signal each appliance 102, 104, 106 to return to the normal operating mode.

Figure 2:
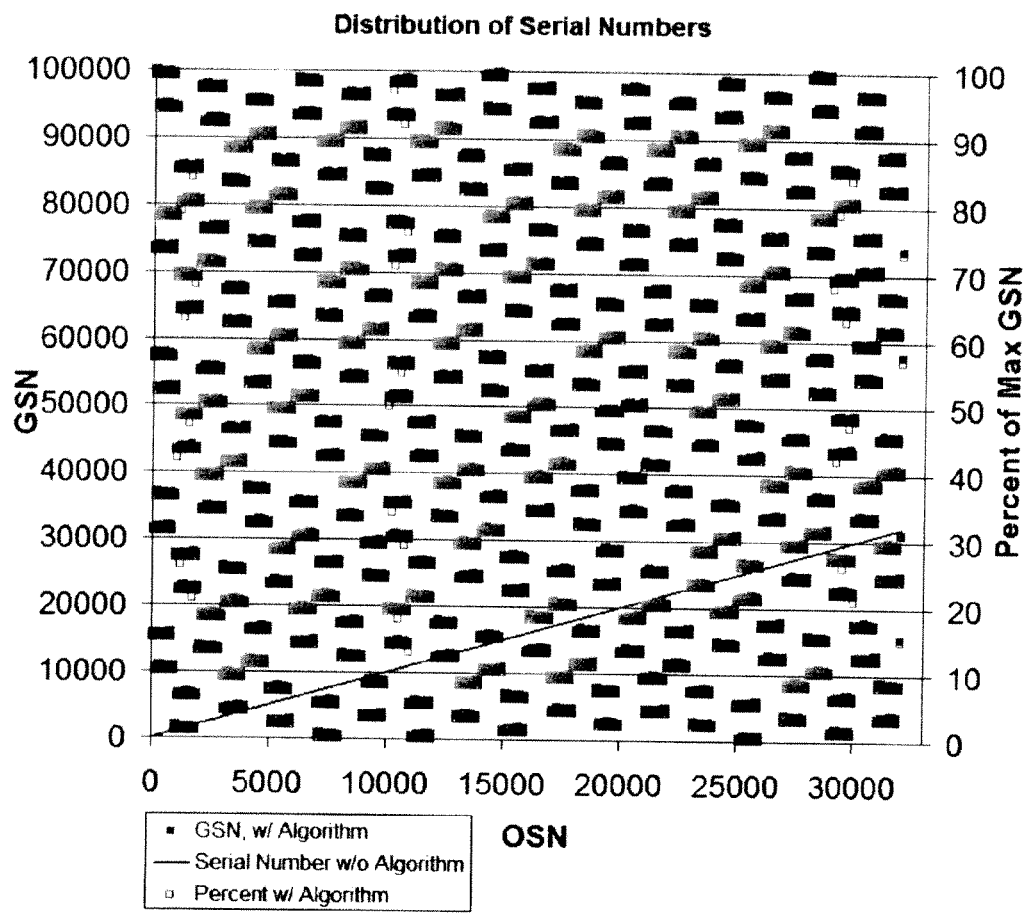
FIG. 2 is a graph illustrating a distribution of generated serial numbers in accordance with another aspect of the present disclosure.

FIG. 2 is a graph that illustrates how generated values (GVs), which are determined from GSNs generated from the original serial numbers (OSNs), are distributed among all the possible values in the range of possible values for all percentage values of the maximum serial number. The linear increase of OSNs illustrates how a system based entirely on OSNs would not produce a random distribution of values due to clumping of percentages. Because any given population may contain many sequential OSNs and those may be from a small subset of all possible serial numbers, a control scheme based on these alone would not be as effective or as evenly distributed as one based on generated values formed from the OSNs.

With such a system as described here, the user also maintains control over the devices because the user has the ability to override utility price signals (with warnings given about any resulting cost of use increase) and control personal comfort and/or price settings, which determine the limits of responses and the standard response for a given signal.

In one embodiment, the consumer/user may override the move to a different population. The cycling through of populations or subset populations of a total population of homes is presented to the user, such as in the user display 120. In this manner, the user can expect and/or plan around the various subset population responses to DR events by being presented subset population and information about the variables of the subset population that the user's home or devices may be currently responding. Override controls may be presented for overriding the move to another subset population of the total population as well as presenting to the user cost savings data for remaining in the subset population being assigned to.

GSNs effectively influence (upon command) the settings and responses of thermostats or appliances of homes in a similar way to a global randomization scheme without using random numbers, statistical distributions, "smart meters" (e.g., AMR/AMI) or head end management to generate GSNs from an original serial number. Within each device, the GV that is derived from the GSN is calculated and used by the device for processing signals from the utility. Signals from the utility therefore are operable to alter variables of the appliances that affect payback spike loads in the population by using the GSN to communicate information to the appliance's controller. Variables of the appliance that may be affected by the signal message payload comprise run times, temperature setpoints, price controls and a population assignor configured to designate a particular subset population that the particular appliance is assigned to in the total population.

The GV is configured so that a distribution of values and responses is seen over the entire population and all home users experience equal responses over a period of time, as discussed above with regard to DR events. For example, the GV of each appliance/appliance microcontroller is made to increment or decrement through all total possible GVs so that each appliance of a subset population will have a different GV after each DR event and all GV values are assigned to appliances equitably. Consequently, a population of homes has turn on times that are capable of being realized with a one-way communication signal using the GSN in the signal payload, while the turn on times are distributed over a time period (e.g., weeks or days) so that no one particular GSN is delayed any longer than any other GSN in a given time frame.

The method and systems herein are applied to any other communicating appliance, device or controller (e.g., PCT, HEM, etc.). In addition, the method and apparatus described are not limited to a one-way communication system, but may be implemented in a two-way communication protocol as well. There are several ways to accomplish this communication, including but not limited to power line carrier (PLC) (also known as power line communication), FM, AM, SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

In one embodiment, a single message system that relies on RDS signals and devices, which are DR enabled, manages DR events and provide payback spike smoothing without the need for a head end monitor, smart meters, two-way communication or other expensive and high maintenance infrastructure, for example. The system relies on generated serial numbers, which are not random for a given device since they are generated deterministically based on the original serial number assigned to the appliance. These, generated serial numbers can cover the entire spectrum of possible values for any given subset of the total population in such a way that they can be used as seeds to parametrically to alter settings and variables in the devices that are DR enabled. The parametric shifting of values and variables (within limits set by users settings and or price signals) and the assigning of different DR profiles for given populations based on the generated serial numbers is the basis behind, which the system performs load shedding and payback spike smoothing and reduction.

Variables used to command instructions to the devices or the device microcontroller respectively are sent within the communication message sent from the utility. For example, a time hold max (TimeHoldMax) variable is one exemplary embodiment that is the longest time where temperature is allowed to be held high. For example, a temperature setpoint is altered for this duration at the minimum. This value could be determined by a variety of methods. For examples, the time hold max value could result from a combination of the user's comfort/price choice and the criticality of the DR signal. The user or energy consumer may select a maximum temperature that the user will allow or perhaps the user interface (UI) will have a sliding scale that allows the user to choose between price and comfort. The UI then assigns a maximum temperature allowed for any given price level. The value of TimeHoldMax can be built into each energy consuming device, such as a PCT, so that for a given price tier and or user settings the value would be the same across all the units. If this value were used in a refrigerator or freezer it could be based on the safety rating of how long the fridge can be run (for the safety food inside) at its maximum temperature. Any other device that has a length of time that it can be set to a different operation mode can have a variable similar to TimeHoldMax that is created based on the device's operation modes and user input or price information coming in by FM-RDS from the utility. The communication is not limited to FM-RDS or any other specific communication protocol as stated above.

In another embodiment, for example, a time hold min (TimeHoldMin) variable is also sent via a communication message to at least one energy consuming device within a total population of homes. The TimeHoldMin variable provides the shortest time where a temperature is allowed to be held high. For example, a temperature setpoint is altered for this duration at the minimum. A further example is with a time hold standard (TimeHoldStandard) variable, which designates the length of the DR event (as signaled by FM-RDS or other method) from the utility. In another embodiment, this variable could designate the length of time for a higher price level for a consumer on time of use pricing schedule.

Upon initialization, a starting value for the GV, which operates as a percent function, is calculated. As stated above in some detail, calculating the GV is performed when the GSN is divided by the largest serial number (LargestSerial), which is the largest number that can be generated with the same number of digits as the GSN, and that value is multiplied with 100. This operation could be calculated with integer operations only to reduce calculation overhead in the device microprocessor.

In another embodiment, a time hold (TimeHold) variable is communicated in the communication message. The TimeHold variable commands the device to implement the TimeHoldMax and/or the TimeHold min variable as a physical parameter for operation. For example, the TimeHold is equal to the TimeHoldStandard±Generated Value (GV)*TimeHoldStandard. Consequently, a range is provided in which the device operates and is set by parameters capable of being adjusted.

For example, if TimeHold (which is TimeHoldStandard± Generated Value (GV)*TimeHoldStandard) is greater than or equal to TimeHoldMax, which is the longest time where temperature is allowed to be held high, then TimeHold is equal to TimeHoldMax. If TimeHold is less than or equal to TimeHoldMin, which is the shortest time where a temperature is allowed to be held high, then TimeHold= TimeHoldMin. In the above examples, ± denotes a plus/minus function variable (PlusMinusFunction) as further described below.

Upon initialization, (the first time each energy consuming device or thermostat powers on or when experiencing a power reset) the device controller checks the last digit of the serial number. Even values (including 0) will be noted positive (+) and odds will be noted negative (−). This means that upon initial call of the PlusMinusFunction that device or thermostat will experience a positive or negative parametric shift based upon the sign of the function. Each time the PlusMinusFunction is used on a particular device its sign will change. In this way 50% of a given population will experience shifts parametrically beyond the TimeHoldStandard (or other standard value) and 50% will experience shifts less than the standard value, and over time each individual controller or device experiences an equal numbers of positive and negative shifts.

As with the PlusMinusFunction, the value of GV variable can shift each time it is communicated. For example, each time the generated value (as a percent function) is used for any reason to determine a parametric shift (e.g., for temperature setback, duration of setback, ramp-up or ramp-down rates, etc), it can decrease by 3%, 5%, 10%, 25% or any standard universal value so that over time every user experiences all values of the GV. The amount that the GV value decreases each time it is communicated in the communication message or signal could be 5-25% and will be determined and preprogrammed into each device. As an example, if a device begins with the GV of 58%, then the next time the GV is communicated the value will shift to 53%, the time after that to 48%, the time after that 43%, etc. until the value is about to go below zero, in which case it loops back around to 100%. In this manner every PCT, device or controller in any given populations will experience GV percent values across the entire range of possible values and the overall distribution of values will remain constantly uniform.

Figure 3:
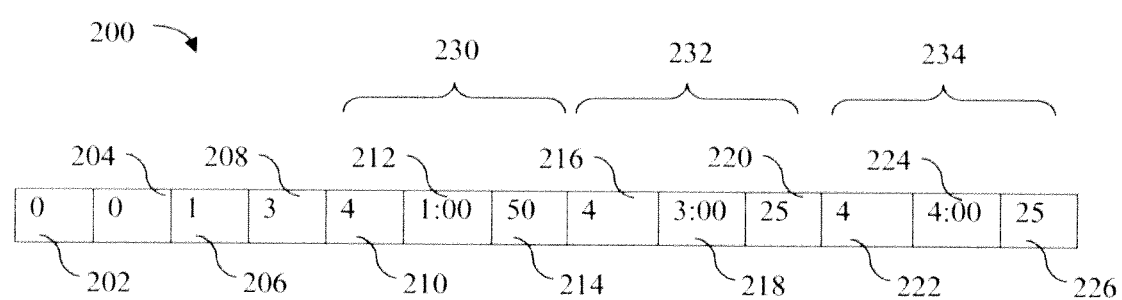
FIG. 3 is a communication message in accordance with another aspect of the present disclosure.

FIG. 3 illustrates one example of a communication message 200 having control information on a single signal that is sent to multiple populations or population subset of a total population of homes by a utility. While a specific signal or communication message is illustrated, the disclosure is not limited to any particular example, which is used for descriptive purposes to detail broader aspects of the disclosure. With such a system as described, a utility sends the signal 200 to set the length of the DR event, price level and/or engages/disengages the controllers to shift physical parameters of energy consuming devices communicatively coupled thereto. These parameters are physical parameters that control the above mentioned variables and/or shift through a plurality of subsets of the total population of homes by incrementing/decrementing the GV upon demand response events for all the homes. Because the GV designates which subset population each home device and/or home is assigned, the GV increments/decrements for DR events to ensure equal treatment over a period of time and different DR events.

For example, during a power system critical emergency, when payback loads are not as important as immediate load shedding, an FM-RDS signal, for example, sent to a population of homes contains a bit that engages or disengages any particular appliance for a function to be performed therein, such as a PercentFunction or a PlusMinusFunction. For example, for temperature setbacks with load smoothing and payback spike reduction among multiple populations or subset populations of a total population, the utility sends a signal, whether in FM-RDS or a different format, which engages all the populations and their responses during a demand response (DR) event. This enables the possibility of a one-way communication without the need for headend investment, such as with advanced metering infrastructures and the like.

The signal message 200 comprises signal payload information in the form of different frames or packets used for signaling a particular DR event. The message has infest Illation blocks of subset populations, for example, a first subset population 230, a second subset population 232, and a third subset population 234. Any number of different subset populations could be designation in a communication message, and the present disclosure is not limited to any specific number, as one of ordinary skill in the art can appreciate. For example, section 202 provides a "0", which denotes that a ramp-up (heat rise) rate should not (or should, for example) be controlled. Section 204 denotes a "0," which designates that the setback temperature or temperature change should not (or should, for example) be controlled. Section 206 is communicating a "1" thereat, which denotes that TimeHold will be parametrically controlled by the message, for example. Section 208 of the message communicates a "3", which designates, for example, that three separate populations will be used for a DR event or a series of DR events. Further, a section 210 contains a "4," which denotes a four degree temperature setback for the first subset population 230. Likewise, information or the subset 230 is contained at section 212 with a "1:00" means the first subset population will start the DR event at 1:00 pm, for example. Section 214 has "50," which means all devices with GV values of 50% or greater are assigned to the first subset population 230, for example. Section 216 contains a "4," which denotes a four degree temperature setback for the second subset population 232. Likewise, "3:00" at section 218 means the second subset population will start the DR event at 3:00 pm. In another example, a section 220 provides "25," which designates all devices with PercentFunction values greater than 25% that are not in the first subset population 230 will be in the second subset population 232. Section 222 contains a "4," which denotes a four degree temperature setback for a third subset population 234. Similarly, section 224 has "4:00" thereat, which means the third subset population 234 will start the DR event at 4:00 pm. A section 226 has "25" thereat, which means all devices with PercentFunction values less than 25% will be assigned to the third subset population 234.

This example message is not meant to be show the limits of such a system as described here but merely to provide one possible way in such a system could be controlled by a single FM-RDS signal, for example. Any type of devices that can receive communication with any number of different possible states and parameters that can be parametrically adjusted could use such a messaging system to control loads during peak periods and provide stabilization of payback load spikes. Different types of devices (both water heaters and PCTs for example) can be controlled from the same message, if they interpret the message bits in a way that is unique to how that device operates and what types of parameters it has. For instance, water heaters may not have multiple states or temperatures so they simply see the message for the example DR event as saying, change to low power operation at 1:00 for 4 hours.

In another embodiment, the message 200 is sent in a two-way communication in a different format than FM-RDS, for example. The signal can be sent into a house within the total population of homes through the meter and then the devices that are responding to the signal can send information back to the energy provider, for example. This may be done using a zigbee smart energy profile, by way of power line carrier (PLC) through the power lines into the meter, by way of an RF signal where the meter has a transceiver for sending/receiving pricing signals and/or demand response signals, or any other communicating format as one of ordinary skill in the art can appreciate.

With such a system as described herein the user or consumer still has control over their own devices because they still have the ability to override utility price signals, with warnings being given about the resulting cost of use increase, while at the same time the consumer's personal comfort or price settings determine the limits of the responses and the standard response for a given signal.

In one embodiment, the devices receiving the signal may be smart appliances that are electronically controlled with software therein. For instance, a refrigerator may run as normal at a low rate (e.g., 4.3 cents) or a medium rate (e.g., 5.1 cents) of a TOU scheme. The refrigerator may respond as normal and do whatever controlled to do, for example, it will defrost whenever it needs. The communication message 200 may programmed such that input comes in from the utility and/or from a home area network (HAN) designating a "3" therein for a high (with low, medium and high, critical as DR event levels to be designated) thereby effectuating the refrigerator to command a disable for a few of the features that consume energy in which the consumer may not be concerned about, such quick chill, quick ice, or various other features that consume power but are not necessary. In turn, the refrigerator may go through a shift to a different set point in the freezer up to 6 degrees, for example. The setpoint time may also be set. Different time frame windows may be set also, such as two, four, or six hour window time frames. For instance, the refrigerator might be started earlier, or left on longer, as adjusted by the device controller via information contained in the message sent. The variables and subset populations in which the refrigerator is assigned can be ratcheted (e.g., incremented/decremented) by to a new GV at each DR event depending on where the refrigerator started and if we're going to ratchet the amount of temperature rise that we're going to shift the home thermostat. For example, some homes may be shifted four hours during an event, while others may be shifted for five hours, for example, so that an equitable and even distribution is created.

Figure 4:
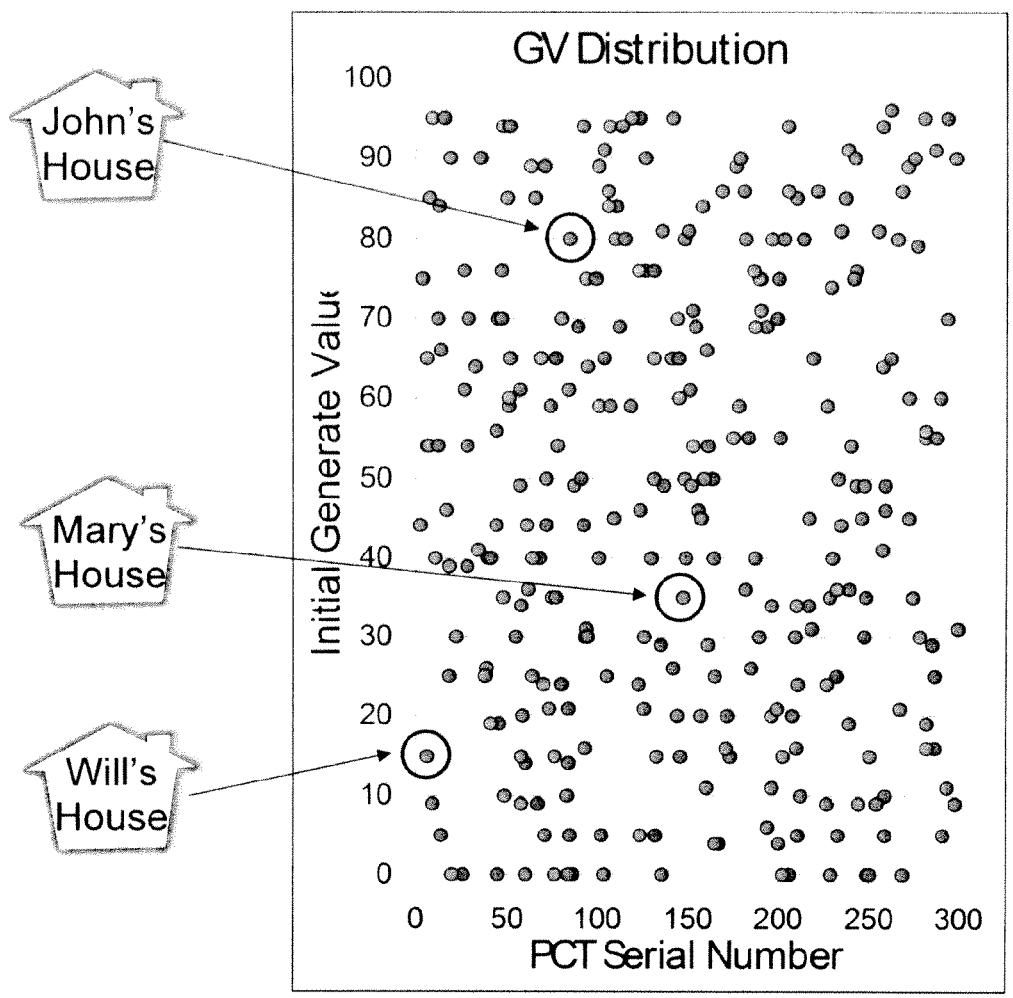
FIG. 4 is a graph illustrating a distribution of generated serial numbers in accordance with another aspect of the present disclosure.

FIG. 4 illustrates an exemplary embodiment of a random distribution of individual homes of a total population. For example, a PCT or other device of a home has a manufactured original serial number (OSN) that is used to create the GV, which spans from zero to one hundred. The GVs are generated in such a way that any sample of devices in the total population should span an entire range of possible values. The GVs then are used to help control how devices of a home respond to DR messages and produce fair and predictable load shed with reduced paybacks.

Figure 5:
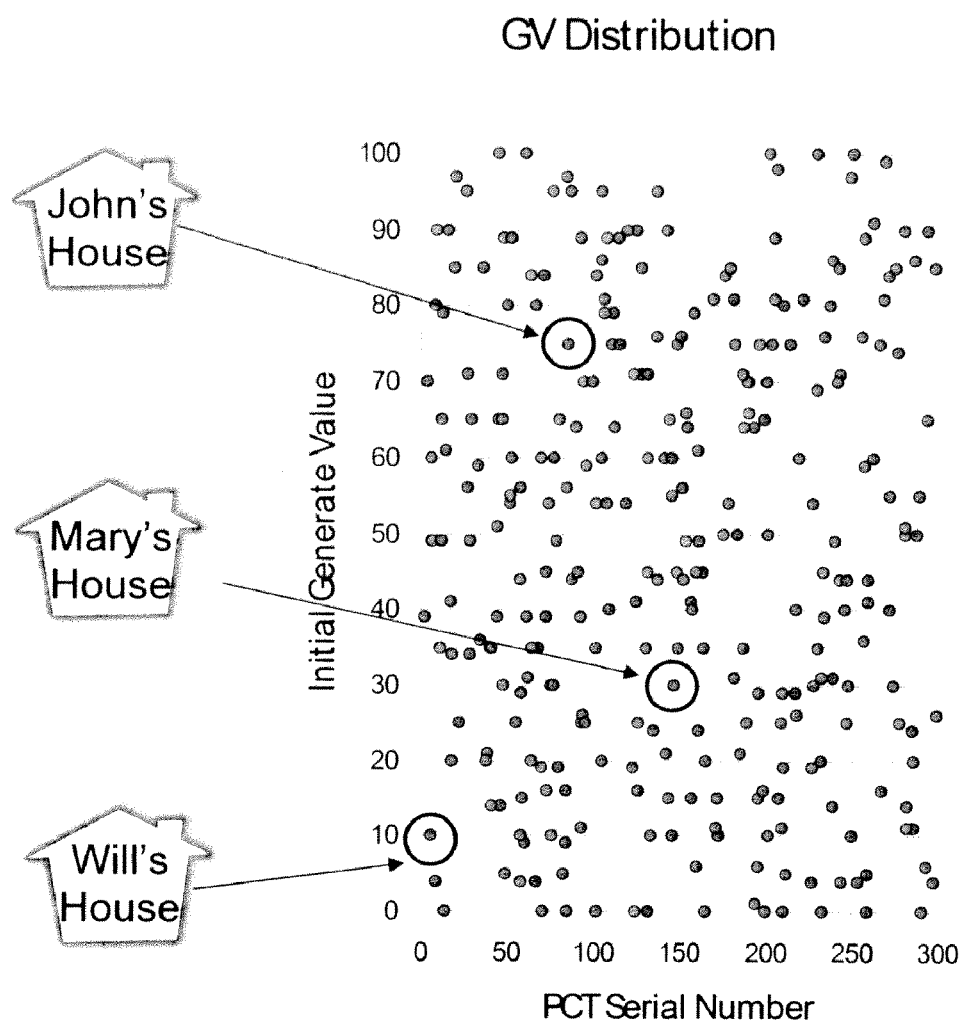
FIG. 5 is a graph illustrating a distribution of generated serial numbers in accordance with another aspect of the present disclosure

All devices of the homes within the total population receive each communication message, such as message 200. As illustrated in FIG. 5, when further messages are sent the GV of each device, or PCT, for example, effectively steps through the entire range of possible responses over time. This allows the system to be equitable for all user/consumers and predictable at an aggregate level. Each time the GV is used in a device it decreases by five, for example, as illustrated in FIG. 5 by the decrease of John's, Mary's and Will's house from FIG. 5. Other increments or decrements could be used other than five to increase or decrease devices throughout the distribution of GVs. Individual homes and/or devices thereat step through in this manner every range of possible GVs (and thereby all possible responses) without affecting the aggregate response.

Figure 6:
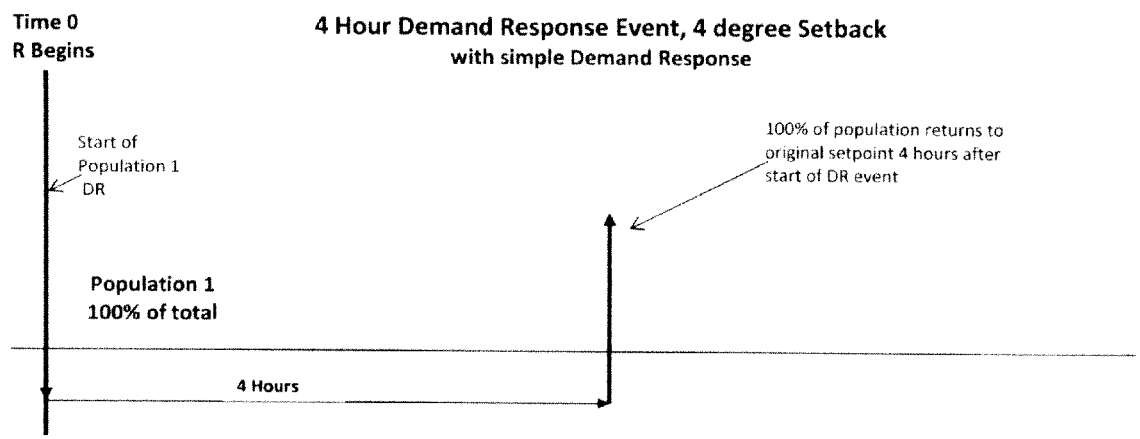
FIG. 6 is an event line illustrating a demand response event in accordance with another aspect of the present disclosure.

FIG. 6 illustrates an example of four hour DR event with a simple demand response having a four degree setback or temperature change as experienced by a change in the setpoint temperature of a total population of homes. At time zero the event begins and the total population entitled "population 1" undergoes a setpoint temperature change of four degrees. After four hours 100 percent of the population returns to the original setpoint temperature.

Figure 7:
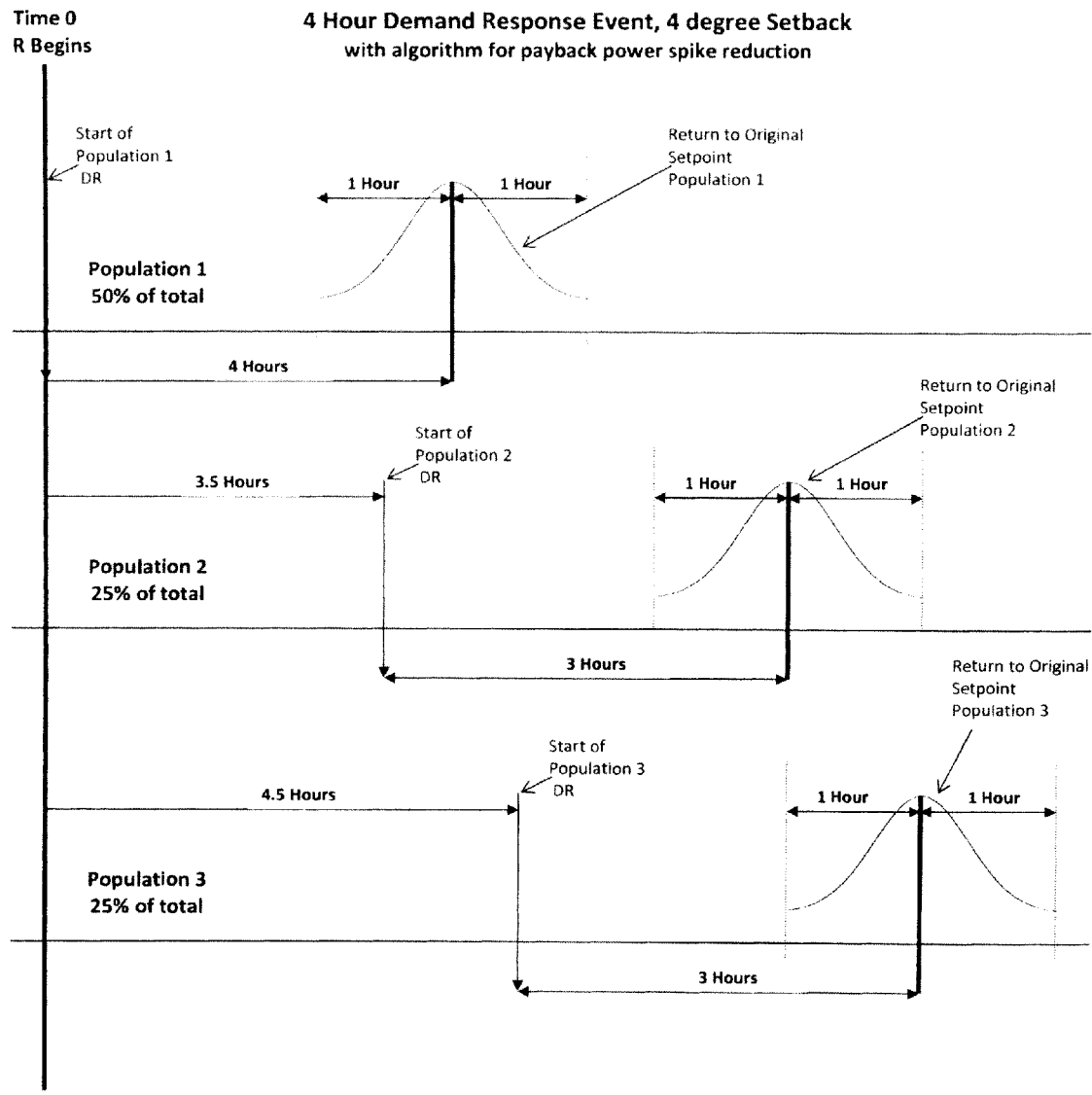
FIG. 7 is an event line illustrating a demand response event in accordance with another aspect of the present disclosure.

FIG. 7 illustrates an exemplary embodiment where a total population of homes is segregated into three separate subset populations that respond independently to a communication message 100, for example. Different homes are assigned to the different subset populations according to GVs generated from OSNs. In contrast to FIG. 6, the total population of homes is broken to three subset populations entitled, "population 1," "population 2," and "population 3." Each subset population is controlled by different variables communicated via a single communication message sent in a DR event signal, for example. Multiples signals or communications may also be used. Each population illustrated, for example, has a demand response event setpoint or start time, a setpoint temperature (e.g., four degrees), a demand response event length time (e.g., four hours for population 1, and three hours for populations 2 and 3). After the demand response event length time each population is returned to the original setpoint population in a distribution.

The aggregate response of an event can be modeled in order to improve load shedding among subset populations each time the GV is incremented/decremented. For example, one DR event could assign subset populations to be the lower 30% of GVs the next subset to be the next 40%, and a third subset to be the top 30% of GVs with temperature reductions of 4 degrees, for example, at 4 to 3 hours of respective populations. The modeled response can then be implemented in the appliances within those subset populations and the results are thereafter used to improve an overall model's representation of the actual effects. In this manner an energy usage and peak loaded profile for the total population of homes can be determined based on physical parameters of the homes. Subsequent DR events can be controlled to produce the same load shed with different information being provided in the signal or communication message to the populations. For example, the subset populations of a subsequent DR event may be 25% 45% 30% with 5 degrees for 3 hours. Each round of subset populations may have a different make-up or physical parameters causing different energy usage profiles, which can be determined by being modeled. Further, each home monitors its own response relative to the signaled length and energy reduction therefore the controlled device can monitor if the home is capable of greater energy reduction than signaled (without loss of comfort based on comfort settings) or if the home is not capable within the signaled temperature or time limit of meeting the users cost saving or energy reduction goal the device can modify the homes individual response to more closely match the intended aggregate response up to the limits set by the users comfort choice. This way on any given DR event each home is expected to perform as well or better than the predicted response and some outliers may be modified to more closely match the norm to improve the stability of the overall system.

Figure 8:
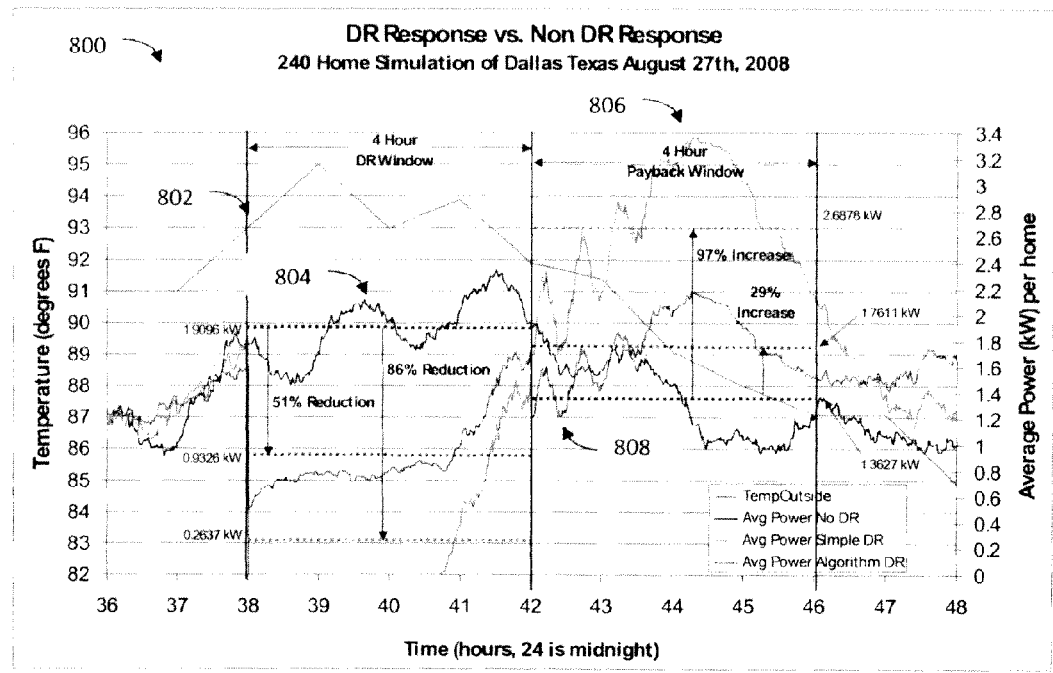
FIG. 8 is a graph illustrating a simulation of homes in a demand response event and a non-demand response event.

FIG. 8. Illustrates an exemplary embodiment of a detailed graph 800 of a simulation model for a total population of homes. A modeling can be performed, such as a software modeling or simulation of various subset populations in order to provide a load reduction that comes from a main population's temperature setback. Other populations are used for payback control. The subset populations can therefore be shifted according to physical parameters being adjusted based on the GVs to reduce peak load and smooth payback spikes, as discussed above. For example, a "head end" software models load shed from an energy usage and peak load profile of each subset population based on physical parameters, such as a home age range, size of the home, an internal home temperature, and outside temperature, a time period, and/or power consumption over time.

A first curve 802 illustrates a temperature outside. A second curve 804 is an average power consumption of a population of homes without a demand response event to save on cost and power efficiency. Curve 806 depicts an average power with a standard demand response event. Curve 808 demonstrates an example of an average power consumption with the methods used herein for subsets of populations. Through simulations load shed can be predicted in the demand response window and reduce or smooth payback spikes, while at the same time minimizing residential discomfort to increase compliance and adoption of such systems.

The simulation is based on a process where it generates a given number of homes and assigns thermal characteristics based parametrically on inputted files. The internal temperatures throughout a given time frame are simulated in order to record and monitor the energy usage of the homes. The simulation outputs setpoint, external and internal temperatures as well as instantaneous loads for each home on a minute by minute basis. The simulation is ran with default inputs and compared to results of actual temperature conditions and load profiles logged by people in order to adjust actual data with simulated data for more accurate predictions of temperature conditions and load profiles.

Figure 9:
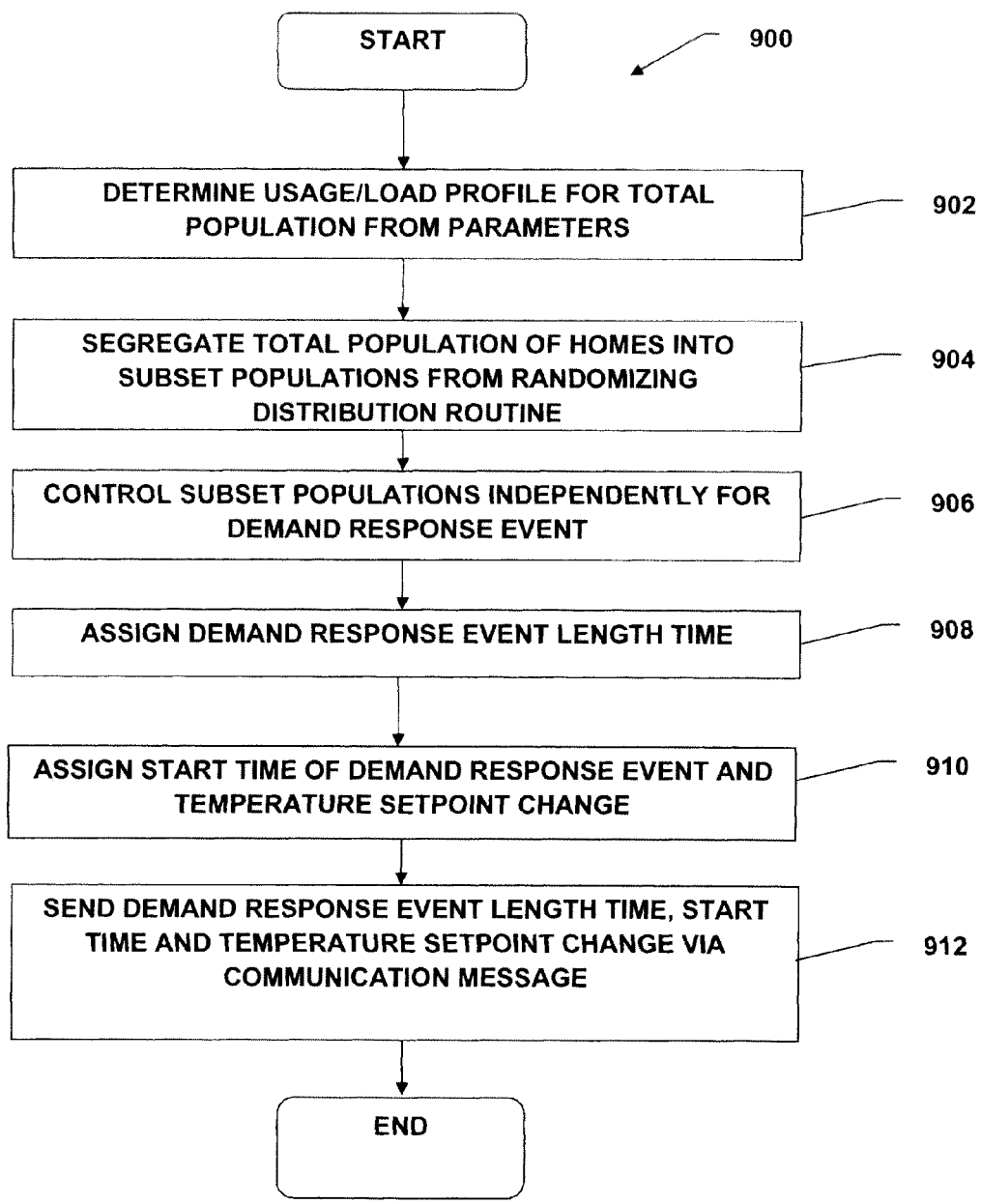
FIG. 9 is a flow diagram illustrating an example methodology for generating a generated serial number from an original serial number.

An example methodology 900 for implementing an energy control system to control load shedding and payback spikes of a population is illustrated in FIG. 9. While the method 900 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 900 begins at start and at 902 a usage and peak load profile for a total population of homes is determined. In one embodiment, determining the energy usage and peak load profile comprises simulating a power consumption for the total population based on a number of homes that is less than a total number of homes in the total population that operate at a specified internal temperature and/or a revised internal temperature to predict the power consumption of the total population. For example, a computer model generates a model to predict power consumption of a total population.

At 904 the total population of homes is segregated into subset populations. The segregation of homes into subsets is done by a randomizing distribution routine. This routine generates a generated value, as discussed above.

At 906 the subset populations are controlled independently for a demand response event. Each subset population operates independently in a normal operating mode and an energy savings mode based on a state of an energy supplying utility that is indicate of at least a peak demand period and an off peak demand period. The demand response event is executed for the total population by each subset population responding dependently via an incoming communication message.

At 908 a demand response event length time is assigned to each subset population based on the profile of each subset population. At 910 a start time of a demand response event and temperatures set point change is assigned for each subpopulation independently based on the generated value of the randomizing distribution routine within an appliance micro or one or more energy consuming devices respectively. At 912 the demand response event length time, the start time and the temperature setpoint change assigned is sent via the communication message for the one or more energy consuming devices of each home.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method for an energy control system to control load shedding and payback spikes of a total population having a plurality of subset populations of homes that include one or more energy consuming devices, executed via a controller with at least one memory storing executable instructions for the method, comprising:
    determining an energy usage and peak load profile for the total population of homes based on physical parameters of each home;
    segregating the total population of homes into the plurality of subset populations by a randomizing distribution routine; and
    controlling each subset population independently for a demand response event to operate each subset population independently in a normal operating mode and an energy savings mode based on a state of an energy supplying utility that is indicative of at least one of a peak demand period and an off peak-demand period, wherein the demand response event is executed for the total population by each subset population responding dependently via an incoming communication message.

2. The method of claim 1, further comprising:

assigning a demand response event length time to each subset population based on the profile of each subset population of homes;

assigning a start time of the demand response event and a temperature setpoint change for each subset population independently based on a generated value for the randomizing distribution routine generated within an appliance micro of the one or more energy consuming devices; and sending the demand response event length time, the start time and the temperature setpoint change assigned to each subset population via the incoming communication message for the one or more energy consuming devices of each home within each subset population having a load that the controller commands to adjust based on the incoming communication message;

wherein the start time, the demand response event length time and/or the temperature setpoint change is different for respective subset populations.

3. The method of claim 1, wherein determining the energy usage and peak load profile comprises simulating via a computer model a power consumption for the total population based on a number of homes that is less than a total number of homes in the total population that operate at a specified internal temperature and/or a revised internal temperature to predict the power consumption of the total population.

4. The method of claim 3, wherein the computer model generates a dynamic model of the total population by directly modeling an average residence and building the model of the total population therefrom by adjusting the parameters between the extreme limits of the total population.

5. The method of claim 1, wherein the incoming communication message initiates the subset populations of homes to shift to a different subset population after the demand response event, wherein the subset populations respectively comprises different temperature setpoints of the one or more energy consuming devices to reduce power consumption and ensure an equal treatment of homes in the total population.

6. The method of claim 1, wherein the random distribution routine comprises assigning each home to one subset population of the plurality of subset populations based on a generated value comprising a percentage generated from an original serial number of the energy consuming devices respectively.

7. The method of claim 1, further comprising: overriding the assignment of the home to a subset population upon receiving a request from a user and assigning the home to a different subset population of the plurality of subset populations; and presenting to the user cost savings data for remaining in the different subset population assigned.

8. The method of claim 6, wherein the generated value is calculated from a generated serial number formed from an original serial number of an appliance or a microcontroller of the appliance.

9. The method of claim 1, wherein the physical parameters comprise at least one of a home age range, size, an internal home temperature, and outside temperature, a time period, and power consumption.

10. The method of claim 1, wherein the demand response event length time is determined based on a generated value generated from the randomizing distribution routine, a user chosen cost/comfort settings of the home, thermal characteristics of the home, a load of a HVAC system of the home, and/or past demand response events experienced by the home.

11. The method of claim 1, wherein the incoming communication message comprises a one-way communication message that enables operation of the energy control system without any smart meters or a head end manager being employed in the energy control system.

12. The method of claim 1, wherein the plurality of subset populations comprises at least two populations of homes, and at least one of the one or more energy consuming devices comprises a programmable communicating thermostat.

13. A method for an energy control system to control load shedding and payback spikes of a total population having a plurality of subset populations of homes that include one or more energy consuming devices, executed via a controller with at least one memory storing executable instructions for the method, comprising:

determining an energy usage and peak load profile for the total population of homes based on parameters of each home;

segregating the total population of homes into the plurality of subset populations by a randomizing distribution routine; and controlling each subset population independently for a demand response event to operate each subset population in a normal operating mode and an energy savings mode based on a state of an energy supplying utility that is indicative of at least one of a peak demand period and an off peak-demand period, wherein the demand response event is signaled to the total population for each subset population to respond independently via a communication message, wherein the communication message comprises a demand response event length time, a start time of the demand response event, and a temperature setpoint change for the demand response event, which correspond to and are respectively different for the subset populations;

wherein the communication message is configured to instruct appliances of homes within each subset population to receive the subset population each home was specifically segregated into, and based on the subset population each home belongs to, and receive the demand response event length time, the start time and the temperature setpoint change for the subset population the home belongs to.

14. The method of claim 13, wherein the communication message initiates the subset populations of homes to shift to a different subset population after the demand response event, wherein the subset populations respectively comprises different temperature setpoints of the one or more energy consuming devices to reduce power consumption and ensure an equal treatment of homes in the total population.

15. The method of claim 13, wherein the random distribution routine comprises assigning each home to one subset population of the plurality of subset populations based on a random process producing an even distribution that changes the subset population assigned over time for subsequent demand response events by using the serial number associated with the one or more energy consuming devices or microcontroller of the one or more energy consuming devices of each home.

16. The method of claim 13, wherein the parameters comprise at least one of a home age range, size, an internal home temperature, and outside temperature, a time period, and power consumption, and wherein the demand response event length time is determined based on a generated value generated from the randomizing distribution routine, a user chosen cost/comfort settings of the home, thermal characteristics of the home, a load of an HVAC system of the home, and/or past demand response events experienced by the home.

17. An energy management system for a household that is part of a randomized distribution of homes in a total population of homes, said energy management system comprising:
   an appliance; and
   a controller coupled with the appliance, the controller is configured to manage power consumption within the household,
   wherein the controller is configured to receive and process a signal indicative of one or more energy parameters of an associated energy supplying utility, including at least a peak demand period or an off-peak demand period,
   wherein the controller is configured to send a command instruction to the appliance to command the appliance to operate in one of a plurality of operating modes, the plurality of operating modes including at least a normal operating mode and an energy savings mode,
   wherein the appliance operates in the normal operating mode during the off-peak demand period and operates in the energy savings mode during the peak demand period,
   wherein the controller is configured to control the return of the appliance to the normal operating mode after the peak demand period is over to prevent an energy surge for the associated energy supplying utility, and
   wherein the controller is configured to permit an end user to override instructions from the associated enemy supplying utility and to allow the end user to select a different population from one or more subset populations of the total population of homes.

18. The energy management system of claim 17, wherein the appliance includes a serial number, the randomized distribution being based at least partially on the serial number of the appliance.

19. The energy management system of claim 17, wherein the appliance includes an HVAC system having a setpoint temperature, wherein the controller is configured to adjust the setpoint temperature to an adjusted temperature in the energy savings mode, wherein the controller is configured to return to the setpoint temperature from the adjusted temperature over a demand response event length time received by the command instruction.

20. The energy management system of claim 17, wherein the command instruction initiates the subset populations of homes to respectively shift to a different subset population after a demand response event, wherein the subset populations respectively comprises different temperature setpoints of the appliance to reduce power consumption and ensure an equal treatment of homes in the total population for load shedding during the demand response event.

* * * * *

UNITED STATES PATENT AND TRADEMARK OFFICE
CERTIFICATE OF CORRECTION

PATENT NO. : 8,386,087 B2
APPLICATION NO. : 12/848615
DATED : February 26, 2013
INVENTOR(S) : Spicer et al.

It is certified that error appears in the above-identified patent and that said Letters Patent is hereby corrected as shown below:

On the Title Page, Item (56), under "OTHER PUBLICATIONS", in Column 2, Line 2, delete "Aggrigated" and insert -- Aggregated --, therefor.

On Title Page 2, Item (56), under "OTHER PUBLICATIONS", in Column 2, Line 7, delete "REsidential" and insert -- Residential --, therefor.

In the Drawings:

In Fig. 4, Sheet 4 of 9, delete " Valut " and insert -- Value --, therefor.

In the Specification:

In Column 2, Line 54, delete "progammable" and insert -- programmable --, therefor.

In Column 3, Line 16, delete "disclosure" and insert -- disclosure; --, therefor.

In Column 3, Line 61, delete "wifi," and insert -- WiFi, --, therefor.

In Column 5, Line 22, delete "en total" and insert -- total --, therefor.

In Column 12, Line 66, delete "GVs" and insert -- GVs, --, therefor.

In the Claims:

In Column 16, Line 5, in Claim 10, delete "a HVAC" and insert -- an HVAC --, therefor.

In Column 16, Line 23, in Claim 13, delete "comprising:" and insert -- the method comprising: --, therefor.

In Column 18, Line 6, in Claim 17, delete "enemy" and insert -- energy --, therefor.

In Column 18, Line 7, in Claim 17, delete "different" and insert -- different subset --, therefor.

Signed and Sealed this
Seventh Day of January, 2014

Margaret A. Focarino
*Commissioner for Patents of the United States Patent and Trademark Office*